United States Patent [19]

Kalat

[11] Patent Number: 5,673,835

[45] Date of Patent: Oct. 7, 1997

[54] BEVERAGE CONTAINER HOLDER

[75] Inventor: Edward W. Kalat, Southington, Conn.

[73] Assignee: Southington Tool & Mfg. Corp., Plantsville, Conn.

[21] Appl. No.: 505,693

[22] Filed: Jul. 21, 1995

[51] Int. Cl.$^6$ ........................................ B60R 7/00
[52] U.S. Cl. ..................... 224/556; 224/414; 224/420; 224/274; 224/926; 224/544; 248/311.2; 248/231.9
[58] Field of Search ..................... 224/420, 926, 224/148.7, 414, 274, 544, 556; 248/318, 311.2, 339, 302, 231.9

[56] References Cited

U.S. PATENT DOCUMENTS

| | | | |
|---|---|---|---|
| 313,667 | 3/1885 | Hesser | 248/318 |
| D. 367,998 | 3/1996 | Graw et al. | D7/620 |
| 2,764,329 | 9/1956 | Hampton | 224/420 |
| 2,893,675 | 7/1959 | Smith et al. | 248/311.2 |
| 3,761,044 | 9/1973 | Ahmer | 248/311.2 |
| 3,913,878 | 10/1975 | Wayne | 248/311.2 |
| 4,324,381 | 4/1982 | Morris | 248/311.2 |
| 4,779,831 | 10/1988 | Anderson | 248/311.2 |
| 5,474,273 | 12/1995 | Vinal | 248/311.2 |

*Primary Examiner*—Linda J. Sholl
*Attorney, Agent, or Firm*—Chilton, Alix & Van Kirk

[57] ABSTRACT

A beverage container holder comprising a basket which is suspended from a vehicle. The basket has first and second rings which define a vertical axis. The vertical portions of a U-shaped support member and a suspension arm are mounted to the rings. The horizontal portion of the support member and a portion of the arm provide a bottom support for a container. An engagement segment of the arm, which intersects the axis defined by the rings, is inserted into a mounting orifice in the vehicle to install the holder. The edge of the orifice engages a center portion of a semi-circular shaped engagement segment of the arm. Generally a beverage container is inserted through the first ring and rests on either the second ring or the horizontal portion of the support member and the arm portion. Therefore, the center of gravity of a loaded beverage container holder is vertically aligned with the point of engagement between the vehicle and the holder. The holder swings freely about the point of engagement with the suspension arm, preventing spilling of the beverage when the vehicle travels over bumps or makes sudden or tight turns.

14 Claims, 2 Drawing Sheets

5,673,835

1

BEVERAGE CONTAINER HOLDER

BACKGROUND OF THE INVENTION

This invention relates generally to beverage container holders. More particularly, the present invention relates to beverage container holders that are mountable to a golf-cart, bicycle, or other relatively slow speed recreational vehicles.

Golf-carts, bicycles and other similar recreational vehicles are commonly utilized during the summer months. Users of these vehicles commonly become thirsty during such use. However, vehicles of this type commonly do not have holders for beverage containers. Therefore, the user is presented with the choice of interrupting the activity to obtain a drink or attempting to hold on to the beverage container while operating the vehicle.

Current beverage containers which may economically be utilized with these vehicles typically hold the container in a rigid manner and are thus unsatisfactory. Travelling over bumps, sudden or tight turns, and other driving activities commonly cause liquids to spill from containers held in such a rigid manner.

Accordingly, there is a need in the art for beverage container holders which are less likely to cause spillage of the beverage when compared to rigidly mounted holders. There is also a need in the art for beverage container holders that may be easily and inexpensively manufactured.

SUMMARY OF THE INVENTION

Briefly stated, the invention in a preferred form is a beverage container holder comprising a basket which is suspended from a vehicle in such a manner as to be maintained in the desired orientation solely by the influence of gravity. The basket has first and second rings which define an axis. The upper first ring has a larger diameter than the lower ring. A generally U-shaped support member defines a pair of leg portions which are mounted to outwardly facing portions of the first and second rings and, in part, define the spacing therebetween. The second leg portion is circumferentially spaced from the first leg portion. A horizontal portion of the support member extends from a first side of the second ring to a second side of the ring thus defining a cord of the circle formed by the second ring.

The holder also comprises a suspension arm having a first portion which is also mounted to the exterior of the first and second rings. The suspension arm first portion is circumferentially spaced from the leg portions of the support member. A second portion of the suspension arm extends obliquely from the first portion towards the axis. A third portion of the suspension arm extends obliquely from the second section of the arm. A fourth portion of the suspension arm extends at an angle from the first portion thereof and intersects the axis. The distal end of the fourth portion is mounted to the horizontal portion of the support member substantially midway between its ends.

The third portion of the suspension arm comprises an engagement segment and a distal end segment. The engagement segment extends from the second portion of the arm and defines a semi-circle wherein the open portion of the semi-circle faces the first ring. The axis defined by the rings intersects the arm at the first engagement portion. The distal end segment extends outwardly from the first engagement segment.

The beverage container holder is installed in a vehicle by inserting the distal end segment of the suspension arm third portion into a complementary sized mounting orifice in a carrier element of the vehicle. The carrier element may, for example, be the handgrip on the end of a handle bar. The edge of the mounting orifice is received in the open portion of the semi-circle and engages the center portion of the arm first engagement segment. Generally a beverage container is inserted through the first ring and rests on either the second ring or the horizontal portion of the support member and the fourth portion of the suspension arm. Therefore, the center of gravity of a loaded beverage container holder is substantially vertically aligned with the point of engagement between the vehicle and the holder and swings freely about the point of engagement. This prevents spilling of the beverage when the vehicle travels over bumps or makes sudden or tight turns.

In a preferred embodiment, the basket and arm are fabricated from a metal wire. A beverage container holder in accordance with the subject invention may be inexpensively and easily manufactured from such material.

An object of the invention is to provide a new and improved beverage container holder for use with a vehicle.

Another object of the invention is to provide a new and improved beverage container holder that minimizes spilling of the beverage.

A further object of the invention is to provide a new and improved beverage container holder that is easily and inexpensively manufactured.

Other objects and advantages of the invention will become apparent from the drawings and specification.

BRIEF DESCRIPTION OF THE DRAWING

The present invention may be better understood and its numerous objects and advantages will become apparent to those skilled in the art by reference to the accompanying drawing in which.

DETAILED DESCRIPTION OF THE PREFERRED EMBODIMENT

With reference to the drawings wherein like numerals represent like parts throughout the several figures, a beverage container holder in accordance with the present invention is generally designated by the numeral 10. The holder comprises a basket 20 which is suspended from a vehicle by a hanger in the form of an elongated arm 40.

Figure 1:
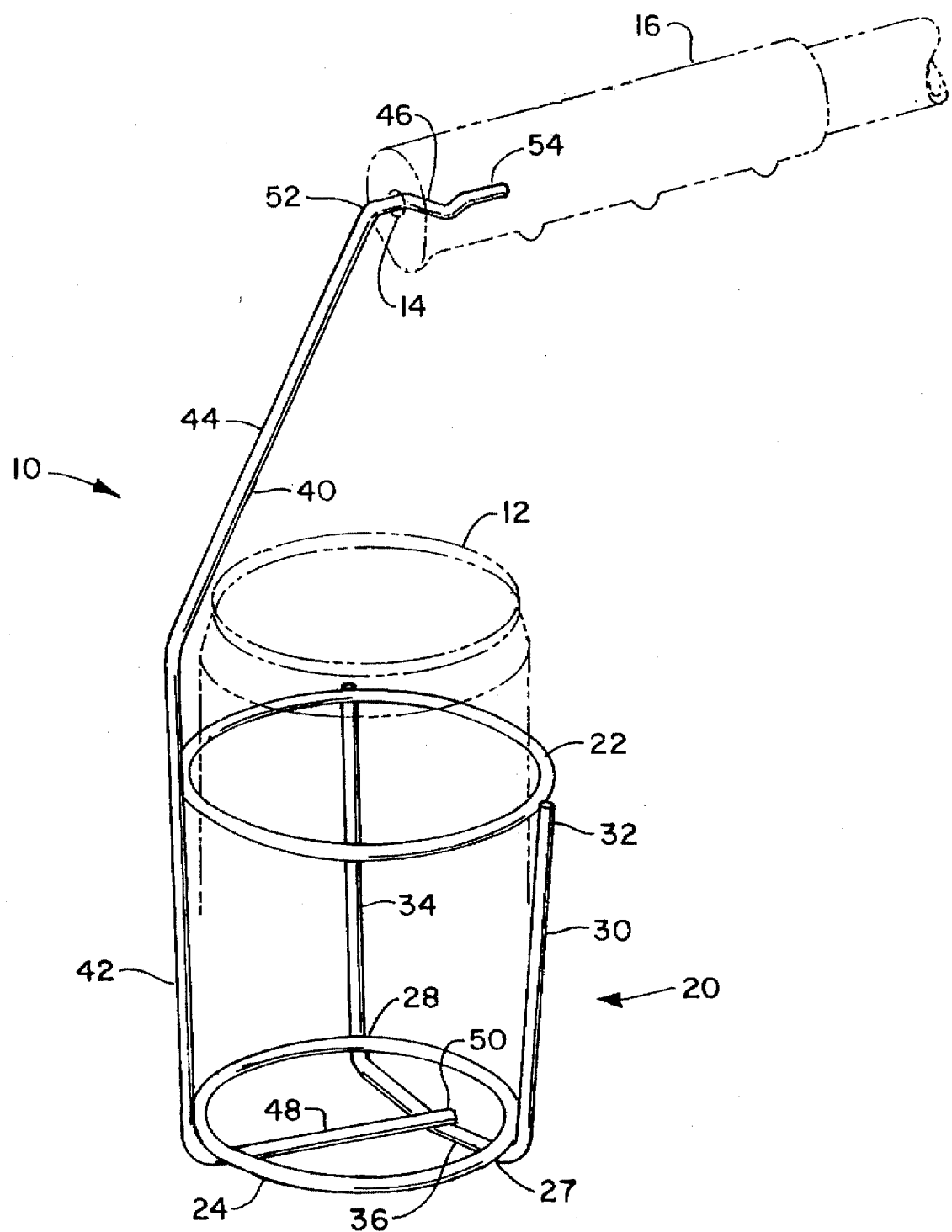
FIG. 1 is a perspective view of a beverage container holder in accordance with the present invention which is mounted to the handle bar or a golf-cart, bicycle, or other similar vehicle.
Figures 2, 3:
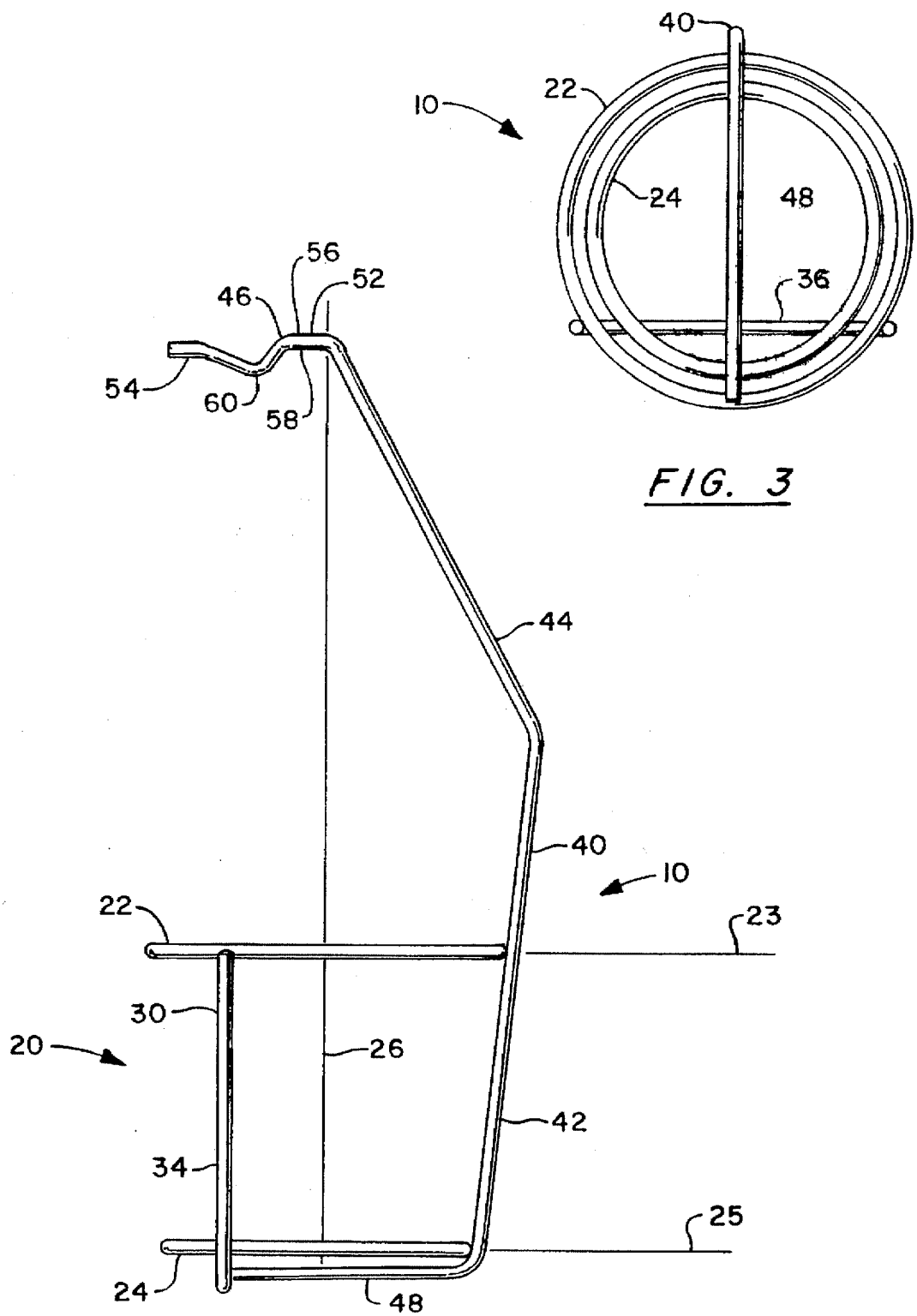
FIG. 2 is a side view of the beverage container holder of FIG. 1.
FIG. 3 is a top view of the beverage container holder of FIG. 1.

The basket comprises first and second rings 22, 24 which define a vertical axis 26 and vertically separated parallel planes 23, 25. In a preferred embodiment, the planes 23, 25 are horizontal when the holder is in use and loaded with a beverage container 12 as shown in phantom in FIG. 1. The upper first ring 22 has a larger diameter than the lower second ring 24 and provides lateral support to a container 12 which is placed in the holder 10. The lower second ring 24 also provides longitudinal support to containers which have an outside diameter less than or substantially equal to the diameter of the second ring 24.

A U-shaped support member 30 defines a pair of vertical portions 32, 34 connected by a generally horizontal base portion 36. The vertical portions 32, 34 are mounted to the first and second rings 22, 24, the second vertical portion 34 being circumferentially spaced from the first vertical portion 32. The vertical portions 32, 34 maintain the vertical distance between the rings 22, 24. The horizontal portion 36 extends from a first point 27 on the second ring 24 to a second point 28 on the ring 24, defining a shelf disposed within the second ring 24. This shelf provides longitudinal support for containers received in the holder.

The arm 40 comprises a first portion 42 which is mounted to the exterior of the first and second rings 22, 24 and is circumferentially spaced from the vertical portions 32, 34 of the support member 30. A second portion 44 of the arm 40 extends obliquely from the first portion 42 towards the axis 26. A third portion 46 of the arm 40 extends obliquely from the second portion 44 of the arm 40. A fourth portion 48 of the arm 40 extends at an angle from the first portion 42 and intersects the axis 26. The distal end 50 of the fourth portion 48 is mounted to the midpoint of the base portion 36 of the support member 30. The fourth portion 48 thereby cooperates with base portion 36 to define a discontinuous base or shelf which provides support to containers having an outside diameter which is less than the inside diameter of the second ring 24.

The third portion 46 of the arm 40 comprises an engagement segment 52 and a distal end segment 54. The engagement segment 52 extends from the second portion 44 of the arm 40 and defines a semi-circle 56 wherein the open portion of the semi-circle 56 faces the first ring 22. In an alternate embodiment, the semi-circle 56 has a flattened center portion 58. The axis 26 defined by the rings 22, 24 intersects the arm 40 at the engagement segment 52. The distal end segment 54 extends outwardly from the engagement segment 52. In a preferred embodiment a first portion 60 of the distal end segment 54 defines a quarter-circle wherein the open portion of the quarter-circle faces away from the first ring 22.

The beverage container holder is installed in a vehicle by inserting the distal end segment 54 of the arm third portion 46 into a mounting orifice 14 in a surface of the vehicle. In the embodiment shown in FIG. 1, the beverage container holder 10 is mounted in an orifice 14 in the hand grip 16 provided at the end of a handle of a golf cart. The edge of the mounting orifice 14 is received in the open portion of the semi-circle 56 and engages the center portion 58 of the engagement segment 52. The distal end segment 54 engages the rear of the vehicle surface and resists inadvertent removal of the arm 40 from the orifice 14.

Generally a beverage container 12 is inserted through the first ring 22 and rests on either the second ring 24 or the base defined by portion 36 of the support member 30 and the fourth portion 48 of the arm 40. Therefore, the center of gravity of a loaded beverage container holder is substantially vertically aligned with the point of engagement between the vehicle and the holder 10. This configuration allows the holder 10 to swing freely about the point of contact between the arm and the orifice 14, preventing spilling of the beverage when the vehicle travels over bumps or makes sudden or tight turns.

In a preferred embodiment, the basket 20 and arm 40 are composed of a heavy gauge metal wire which is not subject to oxidation, i.e., stainless steel or the like. A beverage container holder 10 in accordance with the subject invention may be inexpensively and easily manufactured from such material by welding the components together. It may be appreciated that the basket 20 and arm 40 may be composed of any material that may be joined together in the manner herein disclosed and which will support a full beverage container. In addition, the material may have a ribbon or other suitable shape.

While a preferred embodiment has been shown and described, various modifications and substitutions may be made thereto without departing from the spirit and scope of the invention. Accordingly, it is to be understood that the present invention has been described by way of illustration and not limitation.

What is claimed is:

1. A holder for a beverage container having a circular cross-section, said holder being intended for use with a vehicle having a mounting aperture in a carrier element, said holder comprising:

basket means for receiving and supporting a beverage container, said basket means comprising first and second spatially displaced circular ring members, said ring members being substantially coaxial and defining an axis, said ring members having different diameters, the diameter of said first ring member being smaller than the diameter of said second ring member, said ring members each having an interior surface portion which faces said axis and an exterior surface portion which faces away from said axis, said basket means further comprising at least a first linear support member which interconnects said ring members, said first support member being affixed to a first exterior surface portion of each of said ring members, said first support member diverging relative to said axis in the direction of said first ring member to said second ring member, said basket means also comprising a linear base member which defines a cord of the circle defined by said first ring member, said base member being affixed to said first ring member at two points of intersection therewith; and hanger means for suspending said basket means from a vehicle carrier element having a mounting aperture therein, said hanger means comprising an elongated member having serially arranged first, second and third portions, said first portion of said elongated member including a linear first part which extends between said first and second rings, said linear first part of said first portion of said elongated member being affixed to a second exterior surface portion of each of said ring members, said elongated member linear first portion diverging relative to said axis in the direction of said first ring member to said second ring member, said elongated member first portion cooperating with said first support member to define the spacing between said ring members, said first portion of said elongated member having oppositely disposed first and second ends, said first end of said first portion comprising the first end of said elongated member, said second portion of said elongated member being substantially linear and having first and second oppositely disposed ends, said second portion first end extending obliquely from said second end of said first portion toward said axis, said third portion of said elongated member having oppositely disposed first and second ends, said first end of said third portion extending obliquely from said second end of said elongated member second portion, said second end of said third portion comprising the second end of said elongated member, said third portion being at least in part non-linear and defining a wall engagement segment intermediate said first and second ends of said third portion.

2. The holder of claim 1 wherein said basket means comprises at least a second linear support member interconnecting said ring members, said second support member being circumferentially spaced from said first support member and said linear first part of said first portion of said elongated member.

3. The holder of claim 2, wherein said first and second support members and said base member are integral and define a generally U-shaped structural member.

4. The holder of claim 1, wherein said hanger means first portion is generally L-shaped and is affixed to said base member at said first end, a second part of said elongated member first portion extending from said first end to said first ring member and cooperating with said base member to define a discontinuous bottom shelf of said holder.

5. The holder of claim 4 wherein said basket means comprises at least a second linear support member interconnecting said ring members, said second support member being circumferentially spaced from said first support member and said linear first part of said elongated member first portion.

6. The holder of claim 5, wherein said first and second support members and said base member are integral and define a generally U-shaped structural member.

7. The holder of claim 1 wherein the junction of said hanger means elongated member first and second portions is displaced from said second ring member and is disposed on the opposite side of said second ring member from said first ring member.

8. The holder of claim 7, wherein said hanger means first portion is generally L-shaped and is affixed to said base member at said first end, a second part of said elongated member first portion extending from said first end to said first ring member and cooperating with said base member to define a discontinuous bottom shelf of said holder.

9. The holder of claim 8 wherein said basket means comprises at least a second linear support member interconnecting said ring members, said second support member being circumferentially spaced from said first support member and said linear first part of said elongated member first portion.

10. The holder of claim 9, said first and second support members and said base member are integral and define a generally U-shaped structural member.

11. The holder of claim 10 wherein the junction of said hanger means elongated member second and third portions is juxtapositioned to said axis.

12. The holder of claim 1 wherein the junction of said hanger means elongated member second and third portions is juxtapositioned to said axis.

13. The holder of claim 12 wherein said basket means comprises at least a second linear support member interconnecting said ring members, said second support member being circumferentially spaced from said first support member and said linear first part of said elongated member first portion.

14. The holder of claim 13, said first and second support members and said base member are integral and define a generally U-shaped structural member.

* * * * *